United States Patent Office 3,463,811
Patented Aug. 26, 1969

3,463,811
PROCESS FOR PREPARING SODIUM NITRILOTRIACETATE
John J. Godfrey and James A. Sykes, Silver Spring, and James L. Harper and Charles R. Morgan, Laurel, Md., assignors to W. R. Grace & Co., New York, N.Y., a corporation of Connecticut
No Drawing. Filed Sept. 1, 1967, Ser. No. 664,920
Int. Cl. C07c *121/02*
U.S. Cl. 260—534                                     4 Claims

ABSTRACT OF THE DISCLOSURE

In abstract, this invention is directed to a process for preparing sodium nitrilotriacetate by; (a) forming a nitrilotriacetonitrile slurry by reacting hydrogen cyanide, formaldehyde, and ammonia or hexamethylenetetramine in an aqueous sulfuric acid solution; (b) separating sulfuric acid from the nitrilotriacetonitrile; and (c) hydrolyzing the nitrilotriacetonitrile to sodium nitrilotriacetate by heating said nitrilotriacetonitrile in the presence of an aqueous sodium hydroxide solution wherein sulfuric acid is separated from the nitrilotriacetonitrile by extracting an aqueous slurry of nitrilotriacetonitrile and sulfuric acid with a hydrocarbon oil solution of a high molecular weight, oil soluble, substantially water insoluble amine, all as recited hereinafter.

---

This invention is in the field of sodium nitrilotriacetate ($NTANa_3$) preparation.

In the prior art nitrilotriacetonitrile (NTAN) has been separated from the sulfuric acid containing mother liquor (from which said NTAN precipitated where prepared by the reaction between HCN, formaldehyde, and ammonia or hexamethylenetetramine) by centrifugation or filtration, said NTAN being substantially insoluble in said mother liquor.

In summary, this invention is directed to an improvement in the process for preparing sodium nitrilotriacetate by (i) forming a nitrilotriacetonitrile slurry by reacting hydrogen cyanide, formaldehyde, and a nitrogen containing compound selected from the group consisting of ammonia and hexamethylenetetramine in an aqueous sulfuric acid solution; (ii) separating sulfuric acid from the nitrilotriacetonitrile; and (iii) hydrolyzing the nitrilotriacetonitrile to sodium nitrilotriacetate by heating said nitrilotriacetonitrile in the presence of an aqueous sodium hydroxide solution, the improvement comprising: (a) extracting the nitrilotriacetonitrile slurry with a hydrocarbon oil solution of a high molecular weight, oil soluble, substantially water insoluble amine; (b) separating a resulting first aqueous system, said first aqueous system consisting essentially of an aqueous nitrilotriacetonitrile slurry, said slurry being substantially free of sulfuric acid, from a resulting first nonaqueous phase, said first nonaqueous phase consisting essentially of the hydrocarbon oil solution of high molecular weight, oil soluble, substantially water insoluble amine and sulfate of said amine; (c) actifying the first nonaqueous phase by neutralizing the sulfuric acid component of said nonaqueous phase with a second aqueous system, said second aqueous system consisting essentially of at least one member selected from the group consisting of an aqueous solution of a base having an ionization constant greater than about $1 \times 10^{-5}$ and an aqueous slurry of a base having an ionization constant greater than about $1 \times 10^{-5}$, and separating the actified nonaqueous phase from the second aqueous system; (d) forming a third aqueous system by adding sodium hydroxide to adjust the pH of the first aqueous system to about 13–15, said third aqueous system consisting essentially of water, nitrilotriacetonitrile, and sodium hydroxide; (e) converting the nitrilotriacetonitrile component of the third aqueous system to sodium nitrilotriacetate by heating said third aqueous system at about 70–150° C. for about 1–100 minutes, thereby to form a fourth aqueous system, said fourth aqueous system consisting esentially of water, precipitated sodium nitrilotriacetate, dissolved sodium hydroxide, and dissolved ammonia; (f) separating the thus formed sodium nitrilotriacetate from the fourth aqueous system; (g) drying the separated sodium nitrilotriacetate at about 50–200° C. for about 1–200 minutes; and (h) recovering the thus dried sodium nitrilotriacetate.

In preferred embodiments of the above-described process:

(1) The second aqueous system consists essentially of calcium hydroxide slurry, said slurry analyzing about 1–60% $Ca(OH)_2$; and (2) The separated activated nonaqueous phase is used to extract the nitrilotriacetonitrile slurry.

Sodium nitrilotriacetate ($NTANa_3$) which finds use as a sequestering agent in household detergents including dishwashing compounds, is prepared by the hydrolysis of nitrilotriacetonitrile (NTAN) with an aqueous sodium hydroxide solution (e.g., about 2–40% NaOH, preferably 10–20% NaOH):

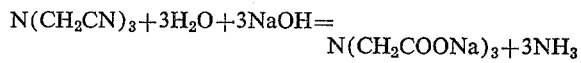

NTAN is generally prepared by reacting formaldehyde and hydrogen cyanide with hexamethylenetetramine (or ammonia) in an aqueous sulfuric acid solution (e.g., 3–11% $H_2SO_4$ preferably 5–10% $H_2SO_4$), said solution having a pH of about 0–2:

$$6HCHO + 12HCN + (CH_2)_6N_4 = 4N(CH_2CN)_3 + 6H_2O$$

Thus it is necessary to neutralize the sulfuric acid dissolved in the mother liquor component of the reaction mixture or to separate the NTAN (which is only slightly soluble in the mother liquor) from the mother liquor before hydrolyzing the NTAN to $NTANa_3$. In the prior art NTAN has generally been separated from mother liquor by centrifugation or filtration prior to converting the NTAN to $NTANa_3$.

We have found that sulfuric acid can be separated from said mother liquor by extracting the mother liquor with a solution of a high molecular weight, oil soluble, substantially water insoluble amine (or mixtures of two or more such amines) in a hydrocarbon oil—preferably in kerosene:

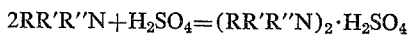

where $RR'R''N$ is a high molecular weight, oil soluble, substantially water insoluble amine or a mixture of two or more such amines.

Typical amines which have given excellent results in the process of our invention are Amberlite XLA–3 (obtained from Rohm and Haas Company), a high molecular weight, oil soluble, substantially water insoluble primary amine having an equivalent weight of about 350, Amberlite LA–2 (obtained from Rohm and Haas Company), a high molecular weight, oil soluble, substantially water insoluble, secondary amine, and Amberlite LA–1 (obtained from Rohm and Haas Company), a high molecular weight, oil soluble, substantially water insoluble, secondary amine. We have obtained excellent results where using Amberlite XLA–3, Amberlite XLA–2, and Amberlite XLA–1 which we have methylated to yield oil soluble, substantially water insoluble, high molecular weight tertiary amines. We have also obtained excellent results with mixtures of two or more of the above-mentioned high molecular, oil soluble, substantially water insoluble, amines.

By oil soluble, substantially water insoluble, high molecular weight amine is meant any primary, secondary, or tertiary amine having a molecular weight of at least about 130, which is soluble in kerosene to an extent of at least about 5%, and which is soluble in water to an extent less than about 1%.

We have obtained excellent results using kerosene solutions of such amines, said solutions containing about 5–99% (preferably about 3–10%) of at least one oil soluble, substantially water insoluble amine. We prefer to use kerosene as a hydrocarbon solvent in the process of our invention to extract or remove $H_2SO_4$ from slurries of NTAN, said slurries being formed by the reaction of HCN with formaldehyde, and ammonia (or hexamethylenetetramine) in sulfuric acid solution. However, we have obtained excellent results with paraffinic, cycloparaffinic, and aromatic hydrocarbon oils, said oils having viscosities within the range of about 1.0–5,000 millipoises at 20–30° C. and being soluble in water to the extent of less than about 0.5–1.5%.

After such extraction, the extracted mother liquor and the precipitated NTAN, said NTAN being substantially insoluble in said mother liquor and in the hydrocarbon oil-amine solution, constitute a first aqueous system and the hydrocarbon oil solution of amine and amine sulfate (said sulfate being soluble in the oil and substantially insoluble in the mother liquor) constitute a first nonaqueous (oil) phase. The aqueous system and nonaqueous phase are separated after said extraction. The aqueous system is passed to a hydrolysis zone where NTAN is hydrolyzed to $NTANa_3$ and the nonaqueous phase is sent to a regeneration, or actification, zone where the amine component of the amine sulfate is regenerated or actified (i.e., converted to free amine) by treating said nonaqueous phase with an aqueous solution or slurry of a base substantially stronger than the amine (or amines) which is combined with sulfuric acid to form amine sulfates.

While substantially any base stronger than the amine which is combined with sulfuric acid can be used to regenerate (free) such amine component of the amine sulfate, we generally prefer, for economic reasons, to use a slurry of calcium hydroxide:

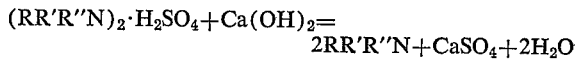

$$(RR'R''N)_2 \cdot H_2SO_4 + Ca(OH)_2 = 2RR'R''N + CaSO_4 + 2H_2O$$

We have also used an aqueous solution of ammonia to activate the amine component of the amine sulfate and have obtained excellent results where using ammonia for this purpose. Any base having an ionization constant (dissociation constant) of $1 \times 10^{-5}$ or greater can be used to activate or regenerate said amine component of said amine sulfate.

The extraction of $H_2SO_4$ from NTAN mother liquor according to the process of our invention has been conducted with excellent results as a batch process, for example, by stirring a mixture of such mother liquor and a hydrocarbon oil solution of oil soluble, substantially water insoluble, high molecular weight amine, in a mixing vessel, permitting the thus stirred mixture to stand, and separating the resulting aqueous and nonaqueus phases. However, we prefer to conduct said extraction as a continuous process using packed towers, agitated towers, spray towers, or the like, or preferably centrifugal-type extractors—the nonaqueous phase being less dense than the aqueous phase, for conducting the extraction of sulfuric acid from the mother liquor and for separating the aqueous and nonaqueous phases.

Regeneration of amine components of amine sulfates has been conducted with excellent results as a batch process, for example, by stirring a mixture of the first nonaqueous phase with a solution of sodium hydroxide or with a slurry of calcium hydroxide, permitting the thus stirred mixture to stand and recovering the resulting second nonaqueous phase, said phase consisting essentially of hydrocarbon oil and amine (or amines). However, we prefer to conduct said regeneration as a continuous process using agitated towers, spray towers, packed towers, centrifugal-type extractors, and the like.

Tertiary amines excellently adapted for use in the process of this invention can be prepared by alkylation of primary amines derived from olefin polymers (propylene or isobutylene polymers of appropriate molecular weight reacted with HCN under strongly acidic conditions—the Ritter reaction).

The process of the instant invention will be better understood by referring to the following specific but nonlimiting examples. It is understood that said invention is not limited to the examples which are offered merely as illustrations, and it is also understood that modifications can be made without departing from the spirit and scope of the invention.

EXAMPLE I

A first aqueous NTAN slurry (said slurry analyzing about 30% NTAN) which had been prepared by reacting formaldehyde, hydrocyanic acid, and hexamethylenetetramine in an aqueous sulfuric acid medium, said medium analyzing about 7% $H_2SO_4$, was passed in downward flow through a first agitated extraction tower at a rate of about 1 gallon per hour while passing a first kerosene solution of high molecular weight, oil soluble, substantially water insoluble tertiary amine (said kerosene solution analyzing about 5% tertiary amine, said tertiary amine having an equivalent weight of about 380) in upward flow (countercurrent to the downward flowing NTAN slurry) through the aforesaid first agitated column, the rate of flow of said kerosene solution being 5 gallons per hour.

A second aqueous NTAN slurry (which was formed in the first extraction column by extracting sulfuric acid from the first NTAN slurry by the first kerosene solution of high molecular weight tertiary amine) was discharged from the bottom of the first extraction column. Said second NTAN slurry was substantially free of sulfuric acid; said second NTAN slurry passed into a tank from which it (said slurry) was pumped to a hydrolysis unit in which NTAN present in said second NTAN slurry was hydrolyzed to $NTANa_3$ by adding sodium hydroxide to adjust the pH of the NTAN slurry (before hydrolysis) to about 13–15 and heating the thus adjusted slurry to about 95–105° C. for about 15 minutes. The thus formed $NTANa_3$ was separated by centrifugation, washed with a saturated (ca. 30–40%) aqueous solution of $NTANa_3$, dried at about 110–130° C. for about 20 minutes, and recovered. (If desired the $NTANa_3$ could be separated by filtration, by decantation, by a combination of decantation and filtration, or by a combination of decantation and centrifugation.)

The conversion (one pass yield) of NTAN to $NTANa_3$ was about 98% of theory based on NTAN feed. Said $NTANa_3$ was of excellent grade; it was well suited for use as a sequestering agent in detergents including household detergents.

In other runs, $NTANa_3$ conversions of about 95–100% of theory have been obtained, and, in other runs, separated $NTANa_3$ has been washed with aqueous $NTANa_3$ solutions analyzing about 25–40% $NTANa_3$ using about 0.1–2.0 parts by weight of such $NTANa_3$ solution per part of separated $NTANa_3$.

A second kerosene solution was formed in the first extraction column by the reaction of high molecular weight tertiary amine (present in the first kerosene solution) with sulfuric acid (present in the first aqueous slurry of NTA)). Said second kerosene solution was discharged from the top of the first extraction column. Said second kerosene solution consisted essentially of kerosene, high molecular weight, oil soluble, substantially water insoluble tertiary amine, and oil soluble, substantially water insoluble tertiary amine sulfate.

Said second kerosene solution was passed in upward flow at a rate of about 5 gallons per hours through a second agitated extraction column where said second kerosene solution was contacted with a first lime slurry, said first lime slurry consisting essentially of water and hydrated quick lime, said lime slurry analyzing about 15% $Ca(OH)_2$, said first lime slurry passing through said second extraction column in downward flow (countercurrent to the upward flowing second kerosene solution) at a rate of about 1 gallon per hour.

A second lime slurry, formed in the second extraction column by the reaction between calcium hydroxide and tertiary amine sulfates, was discharged from the bottom of said second column. Said second lime slurry consisting essentially of calcium sulfate equivalent to the sulfuric acid neutralized by said lime and unreacted (excess) lime was disposed of by depositing in a tailing pond.

A regenerated kerosene solution of high molecular weight, oil soluble, substantially water insoluble tertiary amine, formed in the second extraction column by the reaction between amine sulfates present in the aforesaid second kerosene solution and calicum hydroxide present in the first lime slurry, was discharged from the top of the second extraction column. Said regenerated kerosene solution of high molecular weight, oil soluble, substantially water insoluble tertiary amine, being substantially identical with and indistinguished from the original first kerosene solution of high molecular weight, oil soluble, substantially water insoluble tertiary amine, was recycled (as said first kerosene solution) to the first extraction column.

EXAMPLE II

The general procedure of Example I was repeated; however, in this instance the procedure was modified by replacing the kerosene solution of high molecular weight tertiary amine with a kerosene solution of Amberlite XLA-3, a high molecular weight, oil soluble, substantially water insoluble primary amine obtained from Rohm and Haas Company. Said kerosene solution contained about 5% of the Amberlite XLA-3. The results obtained were indistinguishable from those obtained in Example I.

EXAMPLE III

The general procedure of Example I was repeated. However, in this instance the kerosene solution of tertiary amine was replaced with a mixed xylenes solution of Amberlite LA-2, a high molecular weight, oil soluble, substantially water insoluble secondary amine obtained from Rohm and Haas Company. The results obtained were indistinguishable from those obtained in Example I.

First lime slurries analyzing from about 5 to about 50% $Ca(OH)_2$ have been used in various runs and said lime slurries have been fed into a second extraction column at rates ranging from about 0.1 to about 5000 gallons per hour. Second kerosene (or other oil) solutions of high molecular weight, oil soluble, substantially water insoluble amines analyzing about 10–99% amine have been fed into a second extraction column at rates ranging from about 0.1 to about 5000 gallons per hour.

Other runs were made in which the first lime slurry was replaced with a first aqueous sodium hydroxide solution, said first aqueous sodium hydroxide solution analyzing, in various runs, from about 5 to about 50% NaOH, said sodium hydroxide solution being fed into the second extraction column at rates ranging from about 0.1 to about 5000 gallons per hour.

While excellent results were obtained in the above-mentioned runs, we prefer the following concentrations and feed rates:

PREFERRED CONDITIONS

| Material | Concentration | Feed rate, gallons per hour [1] |
|---|---|---|
| First oil solution | 5% Amine | 10,000 |
| First NTAN slurry | 30% NTAN | 2,000 |
| Second oil solution | 5% Amine [2] | 10,000 |
| First lime slurry | 10–20% $Ca(OH)_2$ | 2,000 |
| First sodium hydroxide solution | 5% NaOH | 2,000 |

[1] Based upon 2,000 gallons NTAN slurry per hour.
[2] The free amine concentration in the second kerosene solution will depend upon operating conditions. The more sulfuric acid extracted from a first NTAN slurry by a given volume of a given first kerosene solution the higher the amine sulfate concentration in the resulting second kerosene solution and the lower the free amine content of said second kerosene solution.

It is obvious, on the basis of our disclosure, that flow rates of solutions and slurries to extraction columns, centrifugal-type extractors, and the like will depend upon the diameters of said columns and upon the internal volume and throughput capacity of centrifugal-type extractors.

The term "percent (%)" as used herein means parts per hundred by weight unless otherwise defined where used.

We claim:
1. In the process for preparing sodium nitrilotriacetate comprising; (i) forming a nitrilotriacetonitrile slurry by reacting hydrogen cyanide, formaldehyde, and a nitrogen containing compound selected from the group consisting of ammonia and hexamethylenetetramine in an aqueous sulfuric acid solution; (ii) separating sulfuric acid from the nitrilotriacetonitrile; and (iii) hydrolyzing the nitrilotriacetonitrile to sodium nitrilotriacetate by heating said nitrilotriacetonitrile in the presence of an aqueous sodium hydroxide solution, the improvement comprising:
   (a) extracting the nitrilotriacetonitrile slurry with a hydrocarbon oil solution of a high molecular weight, oil soluble, substantially water insoluble amine;
   (b) separating a resulting first aqueous system, said first aqueous system consisting essentially of an aqueous nitrilotriacetonitrile slurry, said slurry being substantially free of sulfuric acid, from a resulting first nonaqueous phase, said first nonaqueous phase consisting essentially of the hydrocarbon oil solution of high molecular weight, oil soluble, substantially water insoluble amine and sulfate of said amine;
   (c) actifying the first nonaqueous phase by neutralizing the sulfuric acid component of said nonaqueous phase with a second aqueous system, said second aqueous system consisting essentially of at least one member selected from the group consisting of an aqueous solution of a base having an ionization constant greater than about $1 \times 10^{-5}$ and an aqueous slurry of a base having an ionization constant greater than about $1 \times 10^{-5}$, and separating the actified nonaqueous phase from the second aqueous system;
   (d) forming a third aqueous system by adding sodium hydroxide to adjust the pH of the first aqueous system to about 13–15, said third aqueous system consisting essentially of water, nitrilotriacetonitrile, and sodium hydroxide;
   (e) converting the nitrilotriacetonitrile component of the third aqueous system to sodium nitrilotriacetate by heating said third aqueous system at about 70–150° C. for about 1–100 minutes, thereby to form a fourth aqueous system, said fourth aqueous system consisting essentially of water, precipitated sodium nitrilotriacetate, dissolved sodium hydroxide, and dissolved ammonia;
   (f) separating the thus formed sodium nitrilotriacetate from the fourth aqueous system;

(g) drying the separated sodium nitrilotriacetate at about 50–200° C. for about 1–200 minutes; and (h) recovering the thus dried sodium nitrilotriacetate.

2. The process of claim 1 in which the second aqueous system consists essentially of a calcium hydroxide slurry, said slurry analyzing about 1–60% $Ca(OH)_2$.

3. The process of claim 1 in which the separated actified nonaqueous phase is used to extract the nitrilotriacetonitrile slurry.

4. The process of claim 1 in which sodium nitrilotriacetate is salted out of the fourth aqueous system by adding a 50% sodium hydroxide solution to said fourth aqueous system, said sodium hydroxide solution being added at a rate to provide 3 moles of NaOH per mole of sodium nitrilotriacetate present in said fourth aqueous system.

References Cited

UNITED STATES PATENTS 3,337,607   8/1967   Wollensak _____ 260—534 XR

LORRAINE A. WEINBERGER, Primary Examiner

ALBERT P. HALLUIN, Assistant Examiner

U.S. Cl. X.R.

260—465.5